United States Patent
Hebiguchi et al.

(10) Patent No.: US 8,208,852 B2
(45) Date of Patent: Jun. 26, 2012

(54) ELECTRONIC APPARATUS FOR ELECTRIC FIELD COMMUNICATION

(75) Inventors: Hiroyuki Hebiguchi, Miyagi-ken (JP); Shigetoshi Matsuta, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 170 days.

(21) Appl. No.: 12/855,632

(22) Filed: Aug. 12, 2010

(65) Prior Publication Data

US 2010/0304671 A1    Dec. 2, 2010

Related U.S. Application Data

(63) Continuation of application No. PCT/JP2009/051696, filed on Feb. 2, 2009.

(30) Foreign Application Priority Data

Feb. 22, 2008 (JP) ................................ 2008-040877

(51) Int. Cl.
*H04B 5/00* (2006.01)
(52) U.S. Cl. .................................... 455/41.1; 340/854.8
(58) Field of Classification Search ................. 455/41.1, 455/41.2; 340/854.3, 854.6, 854.8, 870.37
See application file for complete search history.

(56) References Cited

FOREIGN PATENT DOCUMENTS

| JP | 2003-188833 | 7/2003 |
|---|---|---|
| JP | 2006-324774 | 11/2006 |
| WO | 2006/132058 | 12/2006 |

OTHER PUBLICATIONS

International Search Report dated Mar. 3, 2009 from International Application No. PCT/JP2009/051696.

*Primary Examiner* — Lana N Le
*Assistant Examiner* — Golam Sorowar
(74) *Attorney, Agent, or Firm* — Beyer Law Group LLP

(57) ABSTRACT

A casing contains a circuit substrate. A signal electrode for transmitting and/or receiving an electronic field signal is arranged on a first surface side of the casing. The signal electrode is electrically connected to a conductor, which is an apparatus component, of the circuit substrate. A battery and a reference electrode having an electric field reference potential, which are apparatus components, are arranged on the second surface side of the casing. The sum (Cst) of a capacitance between the signal electrode and the transmission medium and a capacitance between the apparatus component and the transmission medium generated while the first surface is facing the transmission medium is approximately equal to the sum (Cgt) of capacitances between the apparatus components and the transmission medium generated while the second surface is facing the transmission medium.

4 Claims, 4 Drawing Sheets

ELECTRONIC APPARATUS FOR ELECTRIC FIELD COMMUNICATION

CLAIM OF PRIORITY

This application is a Continuation of International Application No. PCT/JP2009/051696 filed on Feb. 2, 2009, which claims benefit of Japanese Patent Application No. 2008-040877 filed on Feb. 22, 2008. The entire contents of each application noted above are hereby incorporated by reference.

BACKGROUND OF THE INVENTION

1. Field of the Invention

The present invention relates to electronic apparatuses used for a system in which electric field signals are transmitted and/or received via a transmission medium such as a human body or space.

2. Description of the Related Art

Regarding a communication system in which transmission/reception is performed via a transmission medium (mainly a human body), a method of communication using an electric field is disclosed in, for example, PCT Japanese Translation Patent Publication No. 11-509380. In the system disclosed in this document, a transmitter and a receiver each include an electrode pair, i.e., a pair of a human body side (inner) electrode having close capacitive coupling with a human body and an outer electrode that is arranged in such a manner as to have stronger coupling with the room ground than the human body side (inner) electrode.

In view of deterioration in communication quality caused when unnecessary electromagnetic waves, generated from electronic circuits or a display of a portable terminal for electric field communication, penetrate into a transmission medium such as a human body, Japanese Unexamined Patent Application Publication No. 2005-303922 discloses that transmission/reception electrodes for electric field communication are newly provided at positions away from the circuit components (such as a display, operation keys, an electric field communication transceiver, and a computer) of a portable terminal for electric field communication, thereby suppressing penetration of unnecessary electromagnetic waves generated from the circuit components into a transmission medium, and improving communication quality.

SUMMARY OF THE INVENTION

In electric field communication systems of the related art, the main objective is to perform reliable communication when a user holds an electronic apparatus by hand. In view of this, signal electrodes have received much attention, and the signal electrodes are assumed to be facing a transmission medium (mainly a human body). Hence, electronic apparatuses designed such that the signal electrode faces a human body have a problem in that, assuming a case in which the electronic apparatus is put in a pocket, the transmission power or reception sensitivity changes depending on whether the apparatus is put in a pocket with the signal electrode facing toward the human body or facing away from the human body, and hence, communication may not be performed when the apparatus is put in a pocket with the signal electrode facing away from the human body. If the apparatus is designed assuming the case in which the apparatus is put in a pocket with the signal electrode facing away from the human body, there may be a problem in that, when the apparatus is put in a pocket with the signal electrode facing toward the human body, the transmission power level becomes higher than the design value.

In view of the above point, the present invention provides an easy-to-use electronic apparatus for electric field communication which allows communication to be performed even in the case in which the surface of the electronic apparatus facing a transmission medium is not a signal-electrode-side surface, and which allows a user to perform communication without having to be aware of the front side or back side of the electronic apparatus.

The electronic apparatus for electric field communication of the present invention is an electronic apparatus used as a transmitter and/or a receiver in a system performing electric field communication via a transmission medium, the electronic apparatus including: a first surface and a second surface opposite each other; a signal electrode for transmitting and/or receiving an electronic field signal arranged on a first surface side; a first apparatus component connected to or capacitively coupled with the signal electrode and arranged on the first surface side; and second apparatus components, including a battery, connected to or capacitively coupled with a reference potential of the electronic apparatus and arranged on a second surface side. A sum ($C_{st}$) of a capacitance between the signal electrode and the transmission medium and a capacitance between the first apparatus component and the transmission medium, generated while the first surface is facing the transmission medium, is approximately equal to a sum ($C_{gt}$) of capacitances between the second apparatus components and the transmission medium generated while the second surface is facing the transmission medium.

This configuration allows a substantially constant level of communication performance to be realized irrespective of whether the first or second surface is facing the transmission medium. Accordingly, a user need not distinguish between the first surface and the second surface of the electronic apparatus, resulting in easier handling.

The electronic apparatus according to the present invention preferably includes a reference electrode having the reference potential. This configuration allows the capacitance generated between the reference electrode connected to the reference potential and a transmission medium to be added, and hence, a capacitance sufficient for performing electric field communication is obtained even when the capacitance formed between the transmission medium and the battery, the circuit substrate, or the like is not sufficient. Additionally, provision of the reference electrode allows a balance in capacitance to be easily realized between the first and second surfaces.

In the electronic apparatus according to the present invention, the first surface and the second surface preferably have approximately the same area which is larger than areas of other surfaces of the electronic apparatus. By employing this configuration, since it is natural to make a surface having a larger area face a transmission medium, a user makes the first or second surface face the transmission medium without being conscious of it, resulting in easier handling.

In the electronic apparatus according to the present invention, the first surface and the second surface preferably have approximately the same area and the area is not the largest compared with other surfaces of the electronic apparatus. This configuration is appropriate for an application in which a user intentionally makes the first or second surface face a transmission medium. Also in this case, the first and second surfaces need not be distinguished, making it possible to realize an easy-to-use electronic apparatus.

The electronic apparatus for electric field communication of the present invention is an electronic apparatus used as a transmitter and/or a receiver in a system performing electric field communication via a transmission medium, the electronic apparatus including: a first surface and a second surface opposite each other; a signal electrode for transmitting and/or receiving an electronic field signal arranged on a first surface side; a first apparatus component connected to or capacitively coupled with the signal electrode and arranged on the first surface side; and second apparatus components, including a battery, connected to or capacitively coupled with a reference potential of the electronic apparatus and arranged on a second surface side. A sum (Cst) of a capacitance between the signal electrode and the transmission medium and a capacitance between the first apparatus component and the transmission medium, generated while the first surface is facing the transmission medium, is approximately equal to a sum (Cgt) of capacitances between the second apparatus components and the transmission medium generated while the second surface is facing the transmission medium. Hence, the electronic apparatus is an easy-to-use electronic apparatus which allows communication to be performed even in the case in which the surface of the electronic apparatus facing the transmission medium is not a signal-electrode-side surface, allowing a user to perform communication without having to be aware of the front side or back side of the electronic apparatus.

DESCRIPTION OF THE PREFERRED EMBODIMENTS

Figure 1:
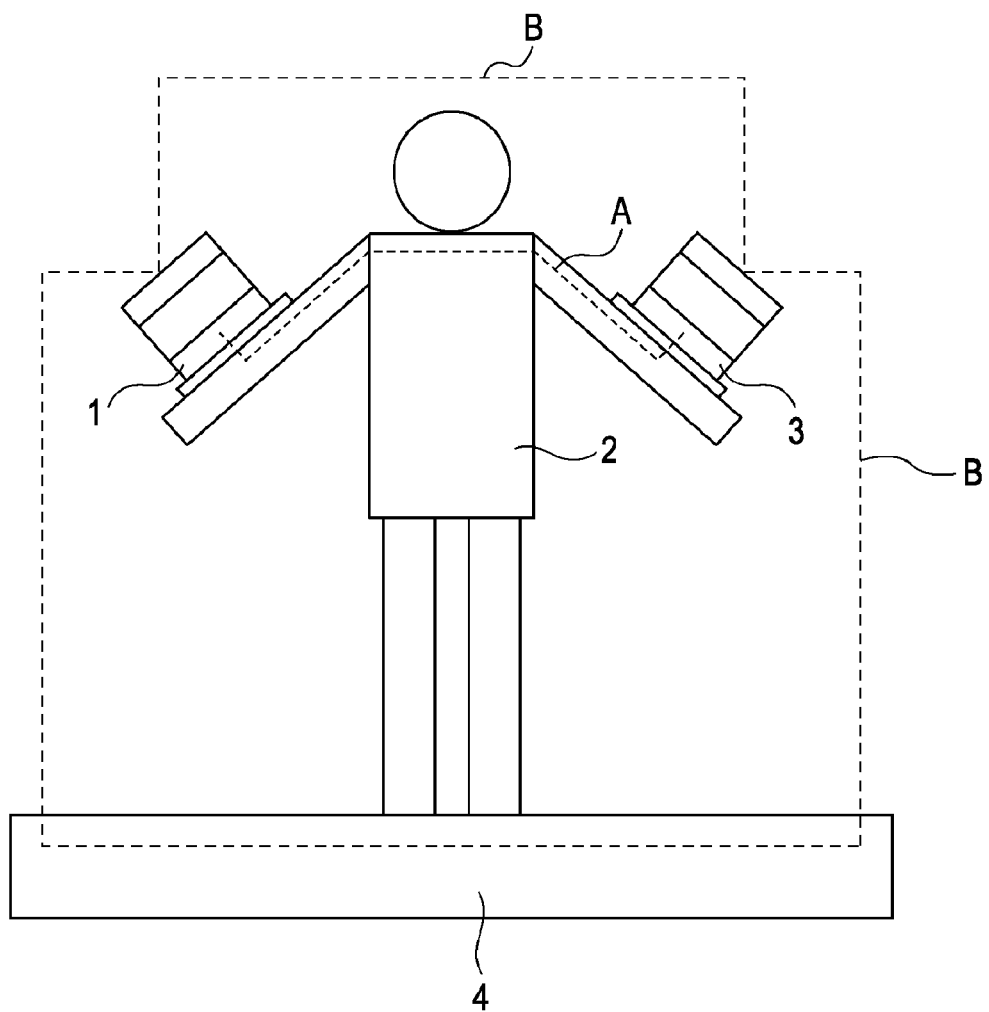
FIG. 1 is a schematic configuration diagram of an electric field communication system using electronic apparatuses according to an embodiment of the present invention.

When an electronic apparatus, such as a cellular phone, whose battery occupies a large portion of the apparatus, is used as a transmitter and/or receiver for electric field communication, it is very important to take into consideration the capacitance between the battery and a transmission medium. If a signal electrode and a reference electrode are simply made to have the same area, the sum (Cst) of the capacitance between the signal electrode and the transmission medium and the capacitances between the apparatus components and the transmission medium generated while a first surface is facing the transmission medium is smaller than the sum (Cgt) of the capacitances between the apparatus components and the transmission medium generated while a second surface is facing the transmission medium, that is Cst<Cgt. This results in a large difference in communication performance between the case in which the first surface is facing the transmission medium and the case in which the second surface is facing the transmission medium. Specifically, when the electronic apparatus is used as a transmitter, if Cgt is larger than expected, the transmission power supplied from the signal electrode (transmission electrode) to the transmission medium becomes higher than expected. In the case of a foldable cellular phone, communication may be performed while the cellular phone is in a pocket in some cases. In such cases, since the cellular phone is put in a pocket in a folded state, it is necessary to balance Cst and Cgt in that state.

In view of the above, the inventors have made the present invention by discovering that a substantially constant level of communication performance is realized irrespective of whether a signal-electrode-side first surface or a second surface is facing a transmission medium, by making the sum (Cst) of the capacitance between the signal electrode and the transmission medium and the capacitances between the apparatus components and the transmission medium generated while the first surface is facing the transmission medium equal to the sum (Cgt) of the capacitances between the apparatus components and the transmission medium generated while the second surface is facing the transmission medium, that is Cst=Cgt, through balancing the capacitance corresponding to the first surface side and the capacitance corresponding to the second surface side, taking into consideration a battery and a circuit substrate.

In other words, the outline of the present invention is that in an electronic apparatus used as a transmitter and/or a receiver in a system performing electric field communication via a transmission medium, a substantially constant level of communication performance is realized irrespective of whether a signal-electrode-side first surface or a second surface is facing the transmission medium, by making the sum (Cst) of the capacitance between the signal electrode and the transmission medium and the capacitances between the apparatus components and the transmission medium generated while the first surface is facing the transmission medium equal to the sum (Cgt) of the capacitances between the apparatus components and the transmission medium generated while the second surface is facing the transmission medium, that is Cst=Cgt, through balancing the capacitance corresponding to the first surface side and the capacitance corresponding to the second surface side, taking into consideration a battery and a circuit substrate.

Hereinafter, embodiments of the present invention are described in detail with reference to the attached drawings.

FIG. 1 is an illustration for describing an electric field communication system using electronic apparatuses according to an embodiment of the present invention.

As described above, in an electric field communication system that performs transmission and reception via a transmission medium (mainly a human body) 2, a transmitter 1 and a receiver 3 each include a pair of a human body side (inner) electrode having close capacitive coupling with the human body 2 and an outer electrode that is arranged in such a manner as to have stronger coupling with the ground 4 than the human body side (inner) electrode. Human body communication using an electric field requires a forward path (path A in FIG. 1) through which a signal flows via capacitive coupling among a transmitter, a human body, and a receiver, and a backward path (path B in FIG. 1) through which a signal flows via capacitive coupling among the receiver, a dielectric such as air or a conductor such as the ground, and the transmitter.

In such an electric field communication system, the transmitter 1 obtains a modulated signal by modulating, for example, an information signal using a carrier wave having frequencies (several hundred kilohertz to several tens of megahertz) for which a human body is conductive. The modulated signal, after amplification, is converted into a voltage that varies, and thereby into an electric field signal corresponding to the modulated signal. This electric field signal is provided to a human body which is the transmission medium 2. Note that there are no specific restrictions on the modulation method in the transmitter 1 and the receiver 3, and baseband transmission without modulation/demodulation may also be used. The electric field signal given to a human body is received by a signal electrode of the receiver 3. The electric field signal received by the signal electrode is amplified and demodulated using the carrier wave used in the transmitter 1, and is output as an information signal.

Figure 2:
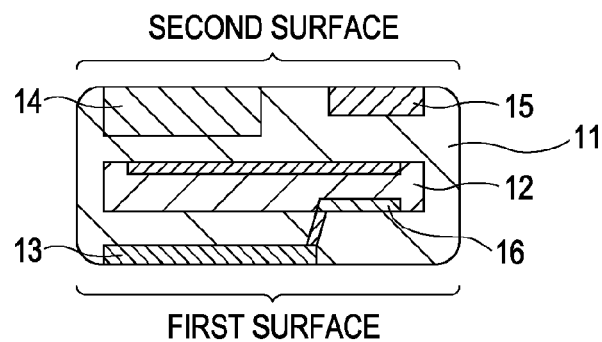
FIG. 2 is a schematic sectional view of an electronic apparatus according to an embodiment of the present invention.

FIG. 2 is a schematic sectional view of an electronic apparatus used as the transmitter 1 or the receiver 3 illustrated in FIG. 1. The electronic apparatus illustrated in FIG. 2 is provided with a casing 11 having a first surface and a second surface opposite each other. A circuit substrate 12 is arranged within the casing 11. A signal electrode (transmission electrode, reception electrode, or transmission/reception electrode) 13 that transmits and/or receives an electric field signal is arranged on the first surface side of the casing 11. The signal electrode 13 is electrically connected to a conductor 16, which is an apparatus component, of the circuit substrate 12. Note that the signal electrode 13 needs to be connected to the conductor 16 of the circuit substrate 12 by means of wiring, capacitive coupling, or the like. A battery 14 and preferably a reference electrode 15 having an electric field reference potential, which are apparatus components, are arranged on the second surface side of the casing 11. Note that the apparatus components include a conductor such as an electrode, wiring for connecting a conductor to a substrate, a battery, an electronic component, and a circuit substrate. The apparatus components need not necessarily be arranged on the exposed surfaces of the casing 11, and may include a case in which the apparatus components are arranged in such a manner as to be relatively closer to either the first or second surface side with respect to the center of the casing 11.

It is preferable that the reference electrode 15 be arranged on the second surface side. The reference electrode 15 may be provided when the capacitance formed between the transmission medium and the battery 14, the circuit substrate 12, or the like is not sufficient. The reference electrode 15 may be provided to obtain a capacitance sufficient for performing electric field communication by adding the capacitance generated between the reference electrode 15 and a transmission medium. Additionally, provision of the reference electrode 15 allows a balance in capacitance to be easily realized between the first and second surfaces. Note that if, for example, the battery 14 is large enough for a balance in capacitance to be realized between the first and second surfaces, the reference electrode 15 need not necessarily be provided.

Figure 3A:
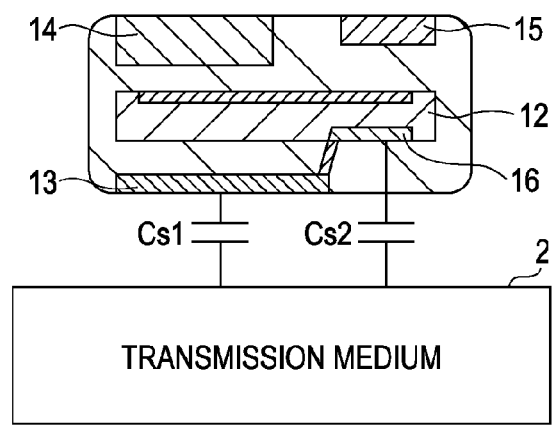
FIGS. 3A and 3B are illustrations for describing capacitances when electronic apparatuses according to an embodiment of the present invention are in a state of being used.
Figure 3B:
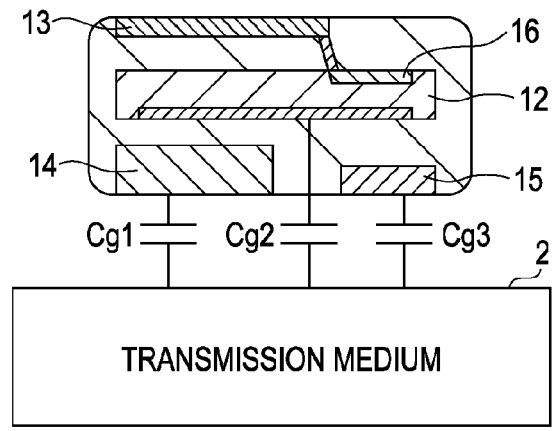

FIG. 3A is an illustration of a state in which the first surface of the electronic apparatus is facing the transmission medium 2, and FIG. 3B is an illustration of a state in which the second surface of the electronic apparatus is facing the transmission medium 2. The electronic apparatus according to an embodiment of the invention is characterized in that the sum (Cst) of the capacitance between the signal electrode 13 and the transmission medium 2 and the capacitance between the apparatus component and the transmission medium 2 generated while the first surface is facing the transmission medium 2 is approximately equal to the sum (Cgt) of the capacitances between the apparatus components and the transmission medium 2 generated while the second surface is facing the transmission medium 2.

For instance, referring to FIG. 3A, in a state in which the first surface of the electronic apparatus is facing the transmission medium 2, by letting Cs1 be the capacitance between the signal electrode 13 and the transmission medium 2, and Cs2 be the capacitance between the conductor (wiring and part of the circuit substrate) 16 connected to the signal electrode 13 and the transmission medium 2, the total capacitance is Cst=Cs1+Cs2.

On the other hand, referring to FIG. 3B, in a state in which the second surface of the electronic apparatus is facing the transmission medium 2, by letting Cg1 be the capacitance between the battery 14 having a reference potential and the transmission medium 2, Cg2 be the capacitance between part of the circuit substrate 12 having the reference potential, and Cg3 be the capacitance between the reference electrode 15 having the reference potential and the transmission medium 2, the total capacitance is Cgt=Cg1+Cg2+Cg3.

Hence, by making Cst approximately equal to Cgt, a substantially constant level of communication performance is realized irrespective of whether the first or second surface is facing the transmission medium 2. Accordingly, a user need not distinguish between the first surface and the second surface of the electronic apparatus, resulting in easier handling. As described above, when the requirement for Cst is satisfied by Cg1 and Cg2 respectively generated by the battery 14 and the circuit substrate 12, a configuration may be used in which the apparatus components do not include the reference electrode 15. Note that when Cst is made approximately equal to Cgt, the difference between Cst and Cgt is preferably within 10%.

In the case of a foldable cellular phone, it is necessary to balance Cst and Cgt on the basis of an evaluation made to determine whether each of, for example, a sub-display and a camera module exposed on the front surface of the cellular phone in a folded state contributes to the signal electrode 13 or the reference electrode 15.

Figure 4:
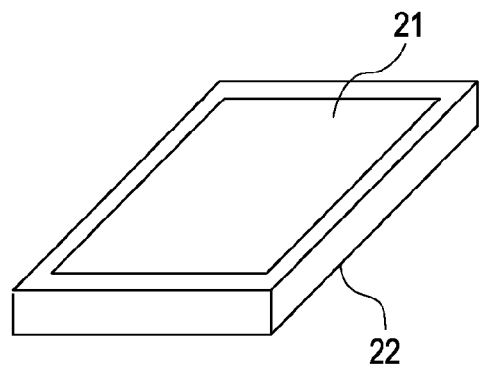
FIG. 4 illustrates an exemplary electronic apparatus according to an embodiment of the present invention.

FIG. 4 illustrates a general electronic apparatus having the shape of a hexahedron. In this electronic apparatus, the surfaces having the largest areas are a top surface 21 and a bottom surface 22, respectively made to be the first surface and the second surface. Note that the top surface 21 and the bottom surface 22 may be respectively made to be the second surface and the first surface. In application areas such as a card-based keyless entry system, various IC-card-based ID keys, and electronic money, there may be a case in which this hexahedron-shaped electronic apparatus is used while in a pocket. In this case, referring to FIG. 5, the electronic apparatus is usually put in a pocket 31 such that the degree to which the pocket 31 bulges out due to the electronic apparatus is smaller, i.e., such that the top surface 21 or the bottom surface 22 faces a human body. Hence, the first or second surface of the electronic apparatus faces the human body, even though a user is not so conscious of it. In the case of an electronic apparatus such as a wristwatch fastened using a wristband 41 illustrated in FIG. 6, for example, the apparatus is arranged such that the top surface 21 or bottom surface 22 faces the human body.

Figure 5:
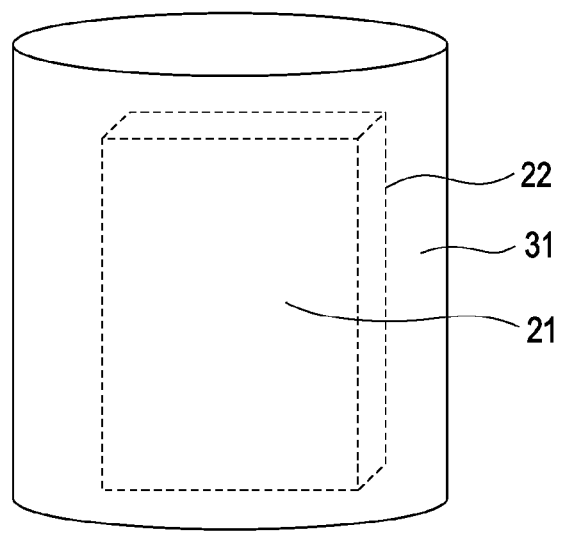
FIG. 5 is an illustration describing a type of usage of the electronic apparatus illustrated in FIG. 4.
Figure 6:
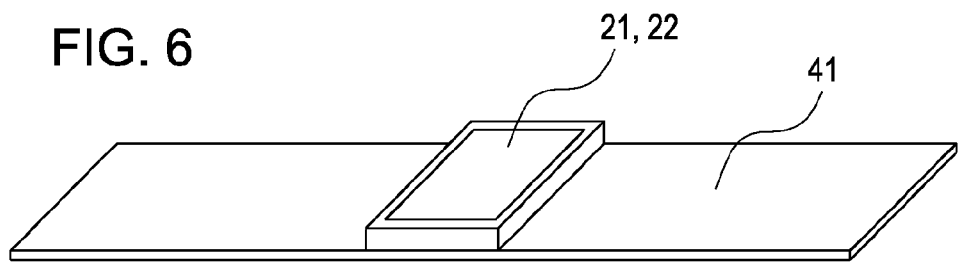
FIG. 6 is an illustration describing another type of usage of the electronic apparatus illustrated in FIG. 4.

In the types of usage illustrated in FIGS. 5 and 6, it is preferable that the first and second surfaces of an electronic apparatus have approximately the same area and this area be larger than the areas of other surfaces of the electronic apparatus. By employing such a configuration, since it is natural to make a surface having a larger area face a transmission medium, a user makes the first or second surface face the transmission medium without being conscious of it, resulting in easier handling.

Figure 7:
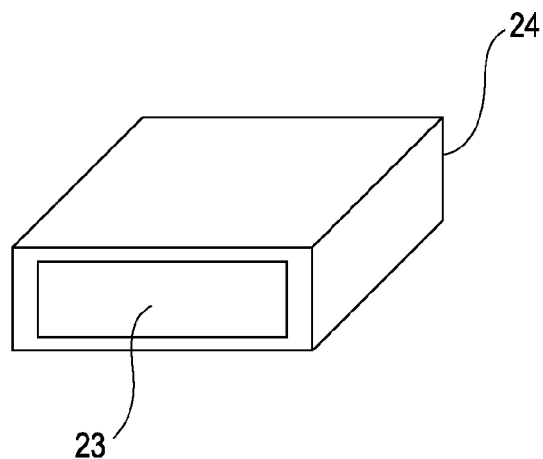
FIG. 7 illustrates another example of an electronic apparatus according to an embodiment of the present invention.

FIG. 7 illustrates another example of an electronic apparatus having the shape of a hexahedron. In this electronic apparatus, surfaces other than the surfaces having the largest areas, here side surfaces 23 and 24, are respectively made to be the first and second surfaces. In other words, in this configuration, surfaces which have smaller areas than the top surface and the bottom surface and which are generally unlikely to face a transmission medium are respectively made to be the first and second surfaces. Such a configuration allows communication to be performed for an operation with the intention of making the apparatus stand on its side. In other words, this can prevent communication from being performed without a user being conscious of it. For example, in the case of the wristband electronic apparatus illustrated in FIG. 6, communication is possible only when a user intentionally makes the apparatus stand on its side, whereas communication is usually in a disabled state by keeping the apparatus laid flat.

Figure 8:
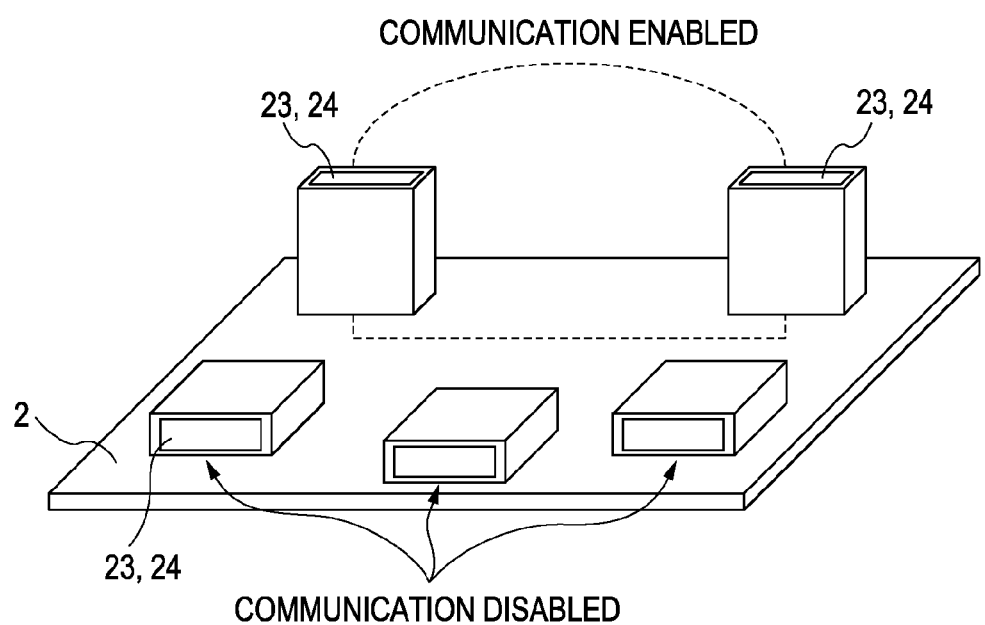
FIG. 8 is an illustration for describing a type of usage of the electronic apparatuses illustrated in FIG. 7.

In FIG. 8, there are a plurality of electronic apparatuses on a plate-shaped transmission medium (conductor or dielectric) 2, and communication is possible among the apparatuses standing on their sides, whereas apparatuses laid flat cannot perform communication. By applying this to a board game, such as Japanese backgammon, it becomes possible to store a path history, or add or reduce points when game pieces stop at specific locations, through communication performed while the pieces are standing. Also in this case, a substantially constant level of communication performance is obtained irrespective of whether the side surface 23 or the side surface 24 is facing the transmission medium 2. Hence, the side surfaces 23 and 24 need not be distinguished, resulting in ease of use.

In the type of usage illustrated in FIG. 7, as described above, it is preferable that an electronic apparatus be provided with the first surface and the second surface having approximately the same area, and this area be not the largest area among the areas of the surfaces of the electronic apparatus. This configuration allows electric field communication to be performed in the application, illustrated in FIG. 8, in which a user intentionally makes the first or second surface face a transmission medium. Also in this case, the first and second surfaces need not be distinguished, making it possible to realize an easy-to-use electronic apparatus.

The present invention is not limited to the embodiments described above, and various modifications are possible. For instance, the circuit configurations, the number of components, the values, and the like in the embodiments described above are just examples and, not limited to this, can be appropriately modified to realize the present invention. Further various modifications are possible within the scope of the claims of the present invention.

What is claimed is:

1. An electronic apparatus used as a transmitter and/or a receiver in a system performing electric field communication via a transmission medium, the electronic apparatus comprising:
 a first surface and a second surface opposite each other;
 a signal electrode for transmitting and/or receiving an electronic field signal arranged on a first surface side;
 a first apparatus component connected to or capacitively coupled with the signal electrode and arranged on the first surface side; and
 second apparatus components, including a battery, connected to or capacitively coupled with a reference potential of the electronic apparatus and arranged on a second surface side,
 wherein a sum (Cst) of a capacitance between the signal electrode and the transmission medium and a capacitance between the first apparatus component and the transmission medium, generated while the first surface is facing the transmission medium, is approximately equal to a sum (Cgt) of capacitances between the second apparatus components and the transmission medium generated while the second surface is facing the transmission medium.

2. The electronic apparatus according to claim 1, further comprising a reference electrode having the reference potential.

3. The electronic apparatus according to claim 1, wherein the first surface and the second surface have approximately the same area which is larger than areas of other surfaces of the electronic apparatus.

4. The electronic apparatus according to claim 1, wherein the first surface and the second surface have approximately the same area and the area is not the largest compared with other surfaces of the electronic apparatus.

* * * * *